US012665842B2

(12) United States Patent
Sanvito et al.

(10) Patent No.: US 12,665,842 B2
(45) Date of Patent: Jun. 23, 2026

(54) METHOD FOR OPERATING A NETWORK AND A CORRESPONDING NETWORK

(71) Applicant: NEC Laboratories Europe GmbH, Heidelberg (DE)

(72) Inventors: Davide Sanvito, Heidelberg (DE); Roberto Bifulco, Heidelberg (DE); Giuseppe Siracusano, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 18/287,894

(22) PCT Filed: Apr. 27, 2021

(86) PCT No.: PCT/EP2021/061006
§ 371 (c)(1),
(2) Date: Oct. 23, 2023

(87) PCT Pub. No.: WO2022/228659
PCT Pub. Date: Nov. 3, 2022

(65) Prior Publication Data
US 2024/0195733 A1      Jun. 13, 2024

(51) Int. Cl.
*H04L 45/302*       (2022.01)
*H04L 47/127*       (2022.01)
(Continued)

(52) U.S. Cl.
CPC ........ *H04L 45/3065* (2013.01); *H04L 47/127* (2013.01); *H04L 47/265* (2022.05); *H04L 47/56* (2013.01)

(58) Field of Classification Search
None
See application file for complete search history.

(56) References Cited

U.S. PATENT DOCUMENTS

| | | | |
|---|---|---|---|
| 7,293,086 B1 | 11/2007 | Duffield et al. | |
| 9,774,522 B2 | 9/2017 | Vasseur et al. | |

(Continued)

OTHER PUBLICATIONS

Geng, Yilong et al.; "SIMON: a simple and scalable method for sensing, inference and measurement in data center networks"; *Proceedings of the 16th USENIX Symposium on Networked Systems Design and Implementation (NSDI'19)*; Feb. 28, 2019; pp. 549-564; XP055878705; USENIX Association; Berkeley, CA, USA.

(Continued)

*Primary Examiner* — Fadi Haj Said
(74) *Attorney, Agent, or Firm* — Leydig, Voit & Mayer, Ltd.

(57) ABSTRACT
A method for operating a network is provided, where an occupation level of at least one switch queue of at least one network switch is estimated. Data regarding an association between at least one path delay and a corresponding switch queue occupation level of the at least one switch queue is provided or collected. The data is fed to a machine learning model associated with the at least one switch queue. The machine learning model is trained on the basis of the at least one path delay or the data to predict a switch queue occupation level of the at least one switch queue. Information resulting from the trained machine learning model or the predicted switch queue occupation level is used for making a real-time traffic steering decision for load balancing between network paths.

19 Claims, 6 Drawing Sheets

(51) Int. Cl.
H04L 47/265 (2022.01)
H04L 47/56 (2022.01)

(56) References Cited

U.S. PATENT DOCUMENTS

| | | | |
|---|---|---|---|
| 2013/0010610 A1 | 1/2013 | Karthikeyan et al. | |
| 2015/0332165 A1* | 11/2015 | Mermoud | H04L 43/08 |
| | | | 706/12 |
| 2017/0093648 A1* | 3/2017 | ElArabawy | H04L 41/5067 |
| 2018/0359172 A1* | 12/2018 | Yadav | H04L 41/5051 |
| 2021/0089921 A1* | 3/2021 | Aghdasi | G06N 3/09 |
| 2022/0210026 A1* | 6/2022 | Yan | H04L 47/29 |

OTHER PUBLICATIONS

Ruelas, Alex M. R. et al.; "A Load Balancing Method based on Artificial Neural Networks for Knowledge-defined Data Center Networking"; *LANC '18: Proceedings of the 10th Latin America Networking Conference*; Oct. 3, 2018; pp. 106-109; ACM Publications; New York, NY, USA.
Siracusano, Giuseppe et al.; "Running Neural Network Inference on the NIC"; *Computer Science—Distributed, Parallel, and Cluster Computing*; Sep. 4, 2020; pp. 1-27; vol. 1; XP081757236; ArXiv. org, Cornell University; Ithaca, NY, USA.

* cited by examiner

METHOD FOR OPERATING A NETWORK AND A CORRESPONDING NETWORK

CROSS REFERENCE TO RELATED APPLICATIONS

This application is a U.S. National Phase application under 35 U.S.C. § 371 of International Application No. PCT/EP2021/061006, filed on Apr. 27, 2021. The International Application was published in English on Nov. 3, 2022 as WO 2022/228659 A1 under PCT Article 21(2).

FIELD

The present invention relates to a method for operating a network and relates to a corresponding network, wherein an occupation level of at least one switch queue of at least one network switch is estimated.

BACKGROUND

Corresponding prior art documents are listed as follows:

[1] Yilong Geng, Shiyu Liu, Zi Yin, Ashish Naik, Balaji Prabhakar, Mendel Rosenblum, and Amin Vahdat. "SIMON: a simple and scalable method for sensing, inference and measurement in data center networks". In Proceedings of the 16th USENIX Conference on Networked Systems Design and Implementation (NSDI'19). USENIX Association, USA, 549-564.

Further, U.S. Pat. No. 9,774,522 B2 discloses a system and method to reroute traffic present in a network using Machine Learning technique, which helps to predict the network traffic and failure in advance. The machine learning algorithm estimates the traffic between the observed nodes and target node using linear regression. Once the failure is triggered, each node is pre-computed to alternate paths. It is also decided when to reroute the traffic and when not, based on the previous information. Traffic in the network is pro-actively rerouted in order to avoid the network element failure before it occurs.

Further, Alex M. R. Ruelas, Christian Esteve Rothenberg, "A Load Balancing Method based on Artificial Neural Networks for Knowledge-defined Data Center Networking", University of Campinas, October 2018, describes a method to predict network performance knowing the bandwidth and latency of the available network paths. First, they predict path level metrics. Second, the known method does not work online. Further, this document discloses a system and method to predict the network performance according to traffic parameters using an artificial neural network. The Artificial Neural Networks, ANN, model choses the least load path depending on bandwidth and latency. The sFlow-RT protocol is used to gather the bandwidth and latency. Further, the sFlow sends the data to the ANN. The ANN module processes the metrics and chooses the least loaded path. The SDN controller receives the chosen path from the ANN Module and creates flow-tables for allocation to the OpenFlow switches.

Further, U.S. Pat. No. 7,293,086 B1 and US 2013/0010610 A1 disclose applying network configuration and routing data to remove empty demands from the traffic matrix serves to dramatically decrease the problem dimension of computing the pseudo-inverse of the routing matrix, and incorporating user input in context to link failure prediction.

Network measurement and monitoring is a key task in order to understand, debug and improve performance of distributed applications. Methods to perform network monitoring can be classified based on where the measurements are taken, from devices within the network or from devices attached to its edge. Switch based methods rely on state information collected by the network switches; depending on the switch capabilities, these methods provide approximate or exact statistics. Legacy switches can provide only approximate path-level statistics—e.g. Explicit Congestion Notification, ECN—or statistics about number of packets/bytes send/received. Furthermore aggregating these statistics requires extra processing with a non-negligible overhead in terms of computation and network utilization. Programmable switches instead enable accurate per-packet and per-flow measurements: these switches rely on the use of in-band network telemetry and on the programming capability of the switch itself. The drawback of this approach is that in-network telemetry and switch programmability may be supported by the majority of the switches used in the monitored network, e.g. a datacenter network. This limits the applicability of this kind of solutions due to the communication overhead caused by the in-band telemetry data and the cost of replacing commodity hardware with expensive programmable switches. Edge based methods on the contrary do not require specialized hardware in the network and can infer network state directly from the traffic or injecting a negligible amount of control traffic. In fact, they have a vantage point from where it is possible to easily observe path related properties such as, for instance, Round Trip Time, RTT, of a specific path. The disadvantages of these methods are that usually they can obtain only an approximate and partial view of the network state, and methods able to compute a complete view of the network, see for example [1], are not efficient when such information has to be fed to a real-time traffic steering algorithm, e.g. load balancing.

SUMMARY

In an embodiment, the present disclosure provides a method for operating a network, wherein an occupation level of at least one switch queue of at least one network switch is estimated. The method comprises the following steps: providing or collecting data regarding an association between at least one path delay and a corresponding switch queue occupation level of the at least one switch queue; feeding the data to a machine learning model associated with the at least one switch queue; training the machine learning model on the basis of the at least one path delay or the data to predict a switch queue occupation level of the at least one switch queue; and using information resulting from the trained machine learning model or using the predicted switch queue occupation level for making a real-time traffic steering decision for load balancing between network paths. The method can be applied to improve artificial intelligence (AI) systems, to optimize the network or support decision making.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
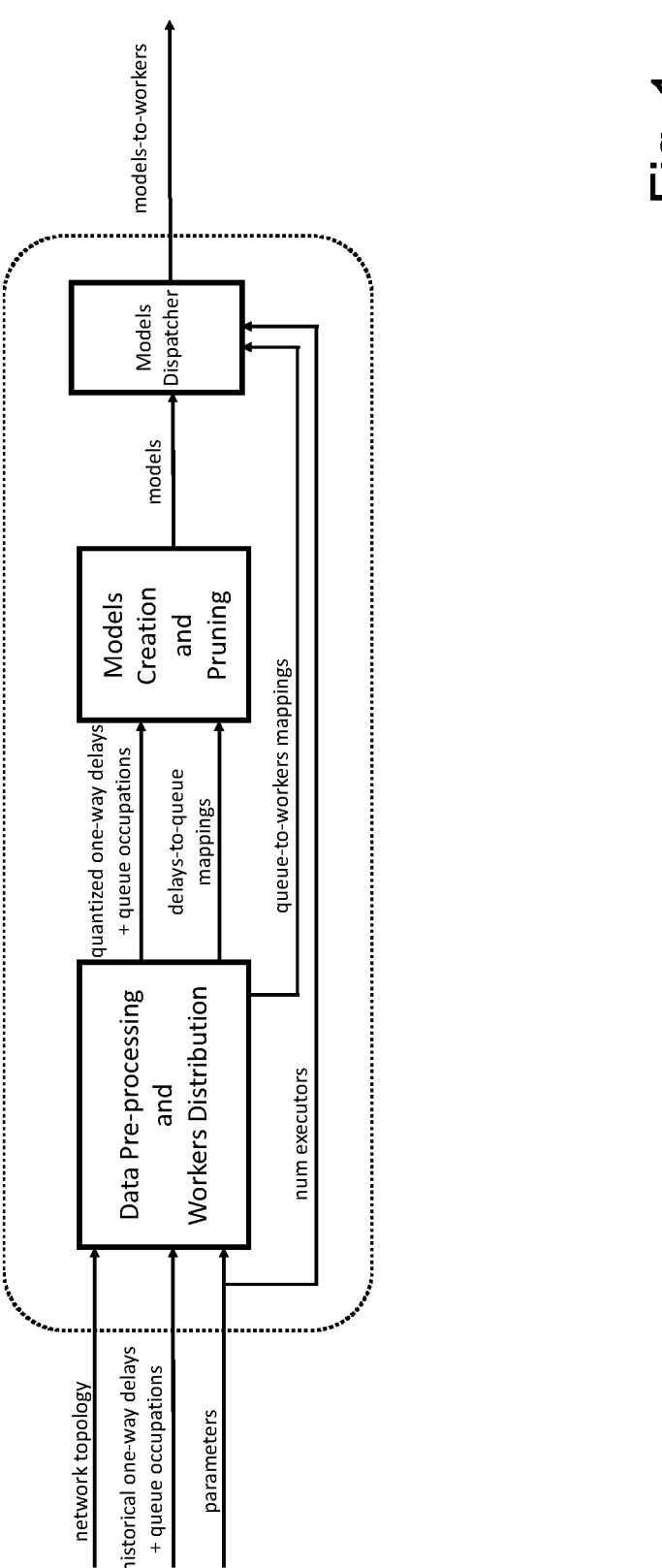
FIG. 1 shows in a diagram off-line training phase system or network components according to an embodiment of the invention.

In accordance with an embodiment, the present invention improves and further develops a method for operating a network and a corresponding network for improving network efficiency and performance by simple means.

In accordance another embodiment, the present invention provides a method for operating a network, wherein an occupation level of at least one switch queue of at least one network switch is estimated, comprising the following steps:

Providing or collecting data regarding an association between at least one path delay and a corresponding switch queue occupation level of the at least one switch queue;

feeding the data to a machine learning model associated with the at least one switch queue;

training the machine learning model on the basis of the at least one path delay or the data to predict a switch queue occupation level of the at least one switch queue; and using an information resulting from the trained machine learning model or using the predicted switch queue occupation level for making a real-time traffic steering decision for load balancing between network paths.

Further, in accordance with another embodiment, the present invention provides a network, wherein an occupation level of at least one switch queue of at least one network switch is estimated, comprising:

providing or collecting means for providing or collecting data regarding an association between at least one path delay and a corresponding switch queue occupation level of the at least one switch queue;

feeding means for feeding the data to a machine learning model associated with the at least one switch queue;

training means for training the machine learning model on the basis of the at least one path delay or data to predict a switch queue occupation level of the at least one switch queue; and using means for using an information resulting from the trained machine learning model or for using the predicted switch queue occupation level for making a real-time traffic steering decision for load balancing between network paths.

According to the invention it has been recognized that it is possible to provide a very efficient method for operating a network wherein machine learning technique is used for providing switch queue occupation level predictions which can be used for making real-time traffic steering decisions. It has been further recognized that using data regarding an association between at least one path delay and a corresponding switch queue occupation level of the at least one switch queue is very efficient for training the machine learning model. The predicted switch queue occupation level is used for selecting how to steer traffic in real-time for providing a suitable load balancing between network paths. A node level metric in the form of a switch queue occupation level is predicted. This allows very fine grained decisions. A quick reaction to a switch congestion is possible.

Thus, on the basis of the invention network efficiency and performance are improved by simple means.

According to an embodiment of the invention a network switch can be realized in the form of a suitable switch, node or link in the network.

According to a further embodiment of the invention the data can result from historical measurements from the network and/or can be use simulation data. Historical data in the form of path delays can be mapped to corresponding switch queues by specific module.

Within a further embodiment the at least one path delay can be a one-way path delay regarding incoming traffic to the respective network switch. On the basis of such embodiments a simple handling of data is possible.

In a further embodiment one or more subsets of network queues and/or corresponding paths can be assigned to a candidate executor host or to a set of candidate executor hosts, wherein the network topology and/or a maximum number of executor hosts can be given or provided. Such an executor host can be realized by a suitable functional entity in the network. The network topology and/or the maximum number of executor hosts can be provided by a user depending on an individual application situation.

According to a further embodiment the path delays—according to their statistical distribution—and/or switch queue occupations—according to a number of occupation levels—or switch queue occupation levels can be quantized. By such a quantization of path delays and/or switch queue occupations or switch queue occupation levels very efficient handling of data and thus operation of the network is possible.

In a further embodiment a size of one or more machine learning models can be reduced or pruned by trying to reduce the number of path delays. Reducing or pruning of a size of one or more machine learning models helps in streamlining the operation of the network for providing a high network performance. Reducing the number of path delays is a simple and effective measure in reaching this goal.

According to a further embodiment one or more machine learning models can be binarized or quantized for further enhancing network efficiency and performance by simple means.

Within a further embodiment—alternatively or additionally to the last mentioned feature—one or more trained machine learning models can be distributed to candidate executor hosts. The number of distributed candidate executor hosts can depend on the individual application situation. The number can be selected in order to provide an efficient network with high performance.

According to a further embodiment one or more machine learning models can be distributed and/or used at one or more devices—for example executor hosts—at end-points or edges of the network, wherein one or more devices can generate at least one explicit congestion notification. As a result, an edge-based method and network can be realized. Specialized hardware in the network is not required in this case.

Within a further embodiment each or some of said devices can monitor a definable partition of the network. This provides a very efficient operation of the network, as not all devices have to monitor the whole network.

According to a further embodiment partitioning and/or distributing of said device or devices can be selected to minimize the computation time and/or maximize estimation accuracy. During this partitioning and/or distributing step a best combination of these measures can be selected for minimizing the computation time and/or maximizing estimation accuracy.

In a further embodiment at least one explicit congestion notification can be sent in a network data plane to enable in-band reconfiguration of packet forwarding operations. Realization of this feature can depend on the individual application situation for enhancing network performance and efficiency.

According to a further embodiment the data and the machine learning model or machine learning models can be split according to network topology and/or to topological information about candidate executor hosts and/or an input data collection process. This splitting step can be performed in view of individual network topology for enhancing network performance the and efficiency.

Within a further embodiment a simulated network for performing packet-level simulation can be created, wherein associations between path delay and occupation or congestion level or levels can be collected for using such associations as—additional or alternative—training data for the machine learning model or at least one machine learning model. Such a simulation is useful for the training step, if the number of historical data is small.

According to a further embodiment the estimation or prediction of the occupation or congestion level or levels can be used by a control plane or by a data plane for taking traffic steering decisions. Depending on individual application situations a control plane or a data plane can be used in an efficient way.

Advantages and aspects of embodiments of the present invention are summarized as follows:

1) Embodiments can compute the occupation level of network nodes' packet queues, from within the data plane of a network end-point's network device, using received packets to measure forwarding delays and providing the measured delays to machine learning models within the same device's data plane, to perform online inference of queues occupation levels. Embodiments apply a machine learning model quantization technique that can convert an original machine learning model in a quantized machine learning model that may only require mathematical operations that are supported within the data plane of a target network device.

2) Further embodiments can use the network topology and the network traffic paths to guide the splitting of a single multiple-outputs machine-learning regression problem into multiple multi-class classification problems, each inferring if a target network packet queue is above a given occupation threshold. Further embodiments can use the result of the machine learning inference performed at the network end-point to generate explicit congestion notifications. Embodiments send the explicit congestion notifications entirely in the network data plane, to enable in-band reconfiguration of the packet forwarding operations 3) Further embodiments can create a simulated network to quickly perform a large number of packet-level simulation in order to collect association between one-way delay and queue congestion levels, and using such associations as training data set for the end-host machine learning models.

Embodiments can comprise a method for Machine-learning-based Real-time Distributed Network Tomography, comprising the steps of.

Learning Phase

1) Collecting historical measurements from the network or use simulation data, for example one-way path delays and corresponding switch queue occupations;

2) Assigning subsets of paths and queues to a set of candidate executor hosts given the network topology and a maximum number of executor hosts provided by the user;

3) Quantizing the one-way path delays—for example according to its statistical distribution—and the switch queue occupations, for example according to the number of occupation levels provided by the user;

4) Feeding the data obtained in step 2 to a Machine Learning model—for example one for each queue—that will be trained to predict the switch queue occupation level given as input the one-way delays of the paths traversing it;

5) Reducing the size of each Machine Learning model—pruning phase—trying to reduce the number of one-way path delays that may be required as input, optional;

6) Binarizing the Machine Learning models to further reduce their size;

Usage Phase

7) Distributing the trained Machine Learning models to the candidate executor hosts;

8) In the Usage Phase using the models trained in the Learning Phase—steps 1-6—to predict the switch queue occupations in real-time;

9) Using the information obtained at step 7 to take real-time traffic steering decisions.

Embodiments of the invention can comprise a method and network or system to provide real-time information for load balancing based on the prediction of the switch packet queues' occupations. The network or system can learn to predict the status of the network from path-related properties from previously observed traffic and can provide a real-time prediction of the congestion status of the queues of the switches.

Further embodiments of the invention can provide an edge based method and a network or system to infer links congestion inside a datacenter network that can be used to take real-time load balancing decisions.

Further embodiments of the invention can provide an edge based method to infer network state directly from the traffic without requiring specialized hardware in the core and enabling real-time load balancing decisions. This improves network performance and reduces latency and reduces the load on a control plane infrastructure.

Further advantages and aspects of embodiments of the present invention are summarized as follows:

Embodiments can use machine learning models at end-points of a network to learn the association between incoming traffic one-way delays and the corresponding network queues occupation levels. Both the training dataset and the model can be split according to topological information about the executors and the input data collection process itself. The machine learning models can be further optimized with pruning and quantization to reduce their size and computational complexity and enable their execution in the network devices' data plane. A multiple-outputs regression problem can be turned into multiple classification problems whose outcome is still sufficient to take a meaningful traffic steering decision.

The result of the machine learning inference performed at the network end-point can be used to generate explicit congestion notifications. Explicit congestion notifications can be sent entirely in the network data plane, to enable in-band reconfiguration of the packet forwarding operations.

A simulated network can be created to quickly perform a large number of packet-level simulation in order to collect association between one-way delay and queue congestion levels, and using such associations as training data set for the end-host machine learning models A further embodiment of the invention provides a method for Machine-learning-based Distributed Real-time Network Tomography.

There are several ways how to design and further develop the teaching of the present invention in an advantageous way. To this end it is to be referred to the following explanation of examples of embodiments of the invention, illustrated by the drawing.

Embodiments of the present invention comprise a network or system and a method to estimate the status of network switches' packet queues in real time. Embodiments of the proposed invention derive from known network tomography application that uses Neural Network, NN, to solve a regression problem, see [1], where the occupation of the queues is inferred offline using a centralized executor that knows all the delays for all the possible paths in the network. Embodiments of the present invention instead can detect the congestions points—switch queues—in real time solving a simpler classification problem. The real time computation can be performed by a set of end host executors distributed at the edges of the network. In order to compute the occupation of the queues present in the network for each queue a small and quantized/binarized NN is trained. These NN are then distributed to executors at the edge of the network that are in charge of the monitoring of a specific partition of the network. Partitioning and distribution are carefully selected to minimize the computation times and maximize estimation accuracy. Moreover, both the use of quantized/binarized NN and the computation distribution allow embodiments of the present invention to provide real-time occupation estimation that can be used by the control plane—out-of-band mode—or by the data plane—in-band mode—to take traffic steering decisions.

Figure 2:
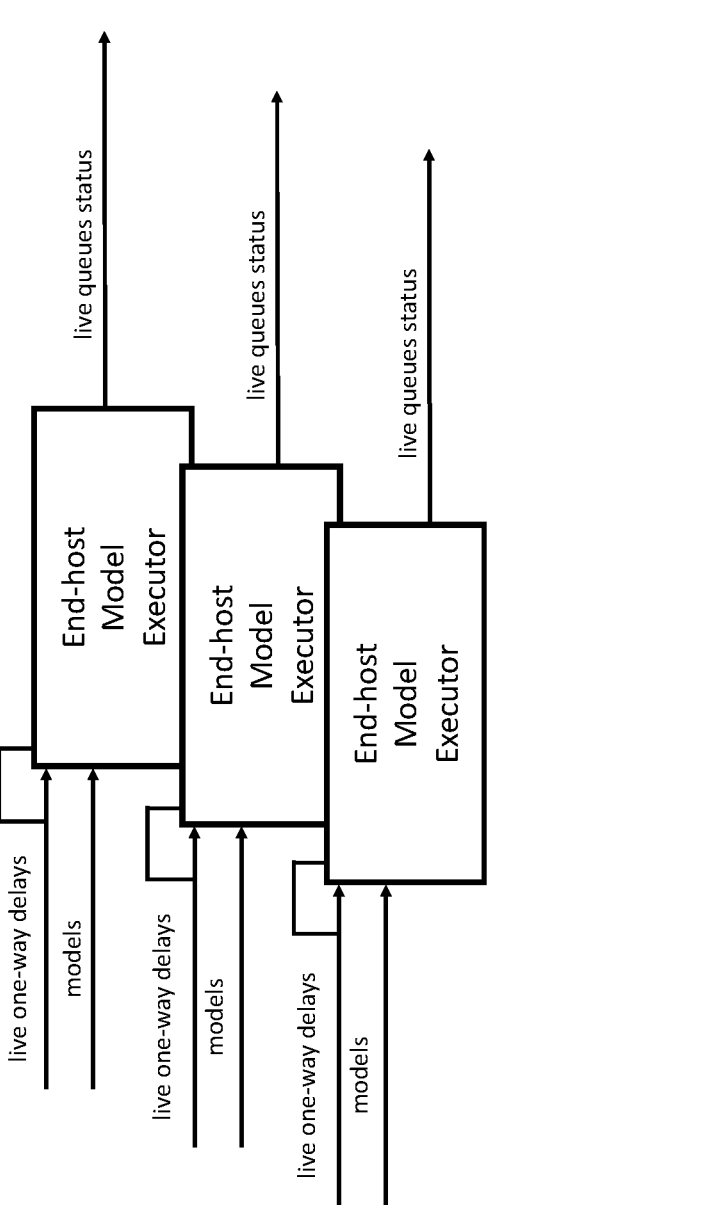
FIG. 2 shows in a diagram a further component in the form of an end-host model executor according to an embodiment of the invention.

The system can be composed by four different subsystems as it is shown in FIG. 1 and FIG. 2.

The Data Pre-processing and Workers Distribution, DPWD, module maps the historical one-way path delays to the respective queues. For each queue it also selects the corresponding host—executor host—that will be in charge of running the NN used to estimate the queue occupation. The number of executor hosts depends on the configuration parameters provided by the user and on the final deployment. When a large number of executors is selected, each one will be in charge of a smaller number of queues, thus the computation load per executor is lower. However, the number of messages used to report the queues status to the traffic steering node will increase. By tuning the configuration parameters, the user can configure this trade-off.

The Data Pre-processing and Workers Distribution, DPWD, module takes as input:
1. Network topology: the set of network switches, links and end-hosts describing the overall infrastructure.

2. Historical one-way delays and queue sizes: the complete historical set of measurements of one-way path delays among all edge switch pairs with corresponding switch queue occupations, measured in number of packets.
3. Configuration parameters: the parameters are used to describe the desired number of queue congestion levels, the desired number of workers among which the prediction task will be divided and whether packet-level simulations shall be performed to generate additional training data.

The DPWD module produces as output:
1. The quantized version of the historical <delays, queues size>samples according to the configured parameters, for each queue present in the network.
2. The mapping from a one-way delay measurement, i.e. a path, to the set of queues traversed by the corresponding path.
3. The mapping from a queue to the candidate set of end-hosts able to receive the data to predict its status.

The DPWD computes the following operations:
1. In absence of historical operational data, or if explicitly requested by the user, packet-level simulations can be used to provide a large variety of training data, i.e. one-way delays associated to queue occupations under different traffic conditions.
2. It analyzes the network topology and compute the complete set of paths connecting all the edge switches present in the network.
   a. Paths are computed taking into account not only the traversed switches but also the specific network interface.
3. For each path selects the set of candidate hosts that are interested by the path, i.e., the hosts that can use that path to communicate.
4. Selects the N executor hosts, where N is the number of executors given as input parameter, whose union of covered paths comprises the entire set of queues in the given topology.
   a. The selection process tries to assign an equal number of queues to each executor host.
   b. when is not possible to cover all the paths with the suggested number of executors the DPWD suggest the minimum number of executors and stops the computation.
5. Each of the N executor hosts is mapped to the set of queues under its responsibility, e.g. for which it has to estimate the level of congestion.
   a. This mapping will then be used by the Model Creation and Pruning, MCP, module.
6. The historical/simulated one-way delays are associated to the respective queue occupation.
   a. Queues are usually not traversed by all the paths, so only a subset of the one-way delay is associated with a specific queue.
   b. Each queue is part of multiple one-way delay paths, at this step in the process some paths may be redundant.
7. The historical/simulated queue occupation is quantized.
   a. Statistical distribution of the queue occupation is calculated.
   b. According to the number of the desired queue congestion level, occupation thresholds are calculated and the queues are correspondingly labeled.
8. The one-ways delays are quantized, e.g. the precision is reduced according to the statistical distribution.

The Model Creation and Pruning, MCP, takes as input:

1. Quantized one-way delays and the associated queue occupation labels.
2. Association between one-way delays and the respective queues.

The MCP module produces as output:

1. For each queue a NN model and its expected inputs to estimate the occupation level.

The MCP computes the following operations:

1. Trains a NN model for each queue:
    a. The model is iteratively retrained using only a subsets of path delays.
    b. Redundant path delays are discovered, and pruned.
2. The trained model is binarized;
    a. Weights and activations are transformed from real numbers to numbers in $\{0,1\}$ set.

The Model Dispatcher is in charge of distributing the trained models to the End-host Model Executors, EME, see FIG. 2. The End-host Model Executors, EME, compute the queue congestion level estimations.

The EME receive as input:

1. NN models for the assigned queues, the output of the Model Dispatcher.
2. One-way delays for the path covering the assigned queues.
    a. Delay can be calculated by observing the real traffic or by probe traffic generated by the EMEs themselves.

The EME produces as output:

1. The estimated live queue status.
    a. In case the system is operating in out-of-band mode the output is sent to an external controller.
    b. In case the system is operating in in-band mode the output is embedded into a packet sent to the traffic sending nodes.

The EME computes the following operations:

1. Collects one-way delays of the assigned paths.
    a. Paths delay are collected for each time interval, where the time interval is configurable or derived from the network link nominal bandwidth.
    b. If during a time interval a path delay is not collected the EMEs can send each other a delay probe to actively measure the path delay. Note that the traffic overhead due to the path delay probes is negligible.
2. One-way delays can be explicitly associated to the path, i.e., path id is embedded into packets header, or can be implicitly associated to the path, i.e., source routing like mechanism is in place.
3. Runs the NNs in order to estimate the queues occupation on the monitored paths.

Figure 3:
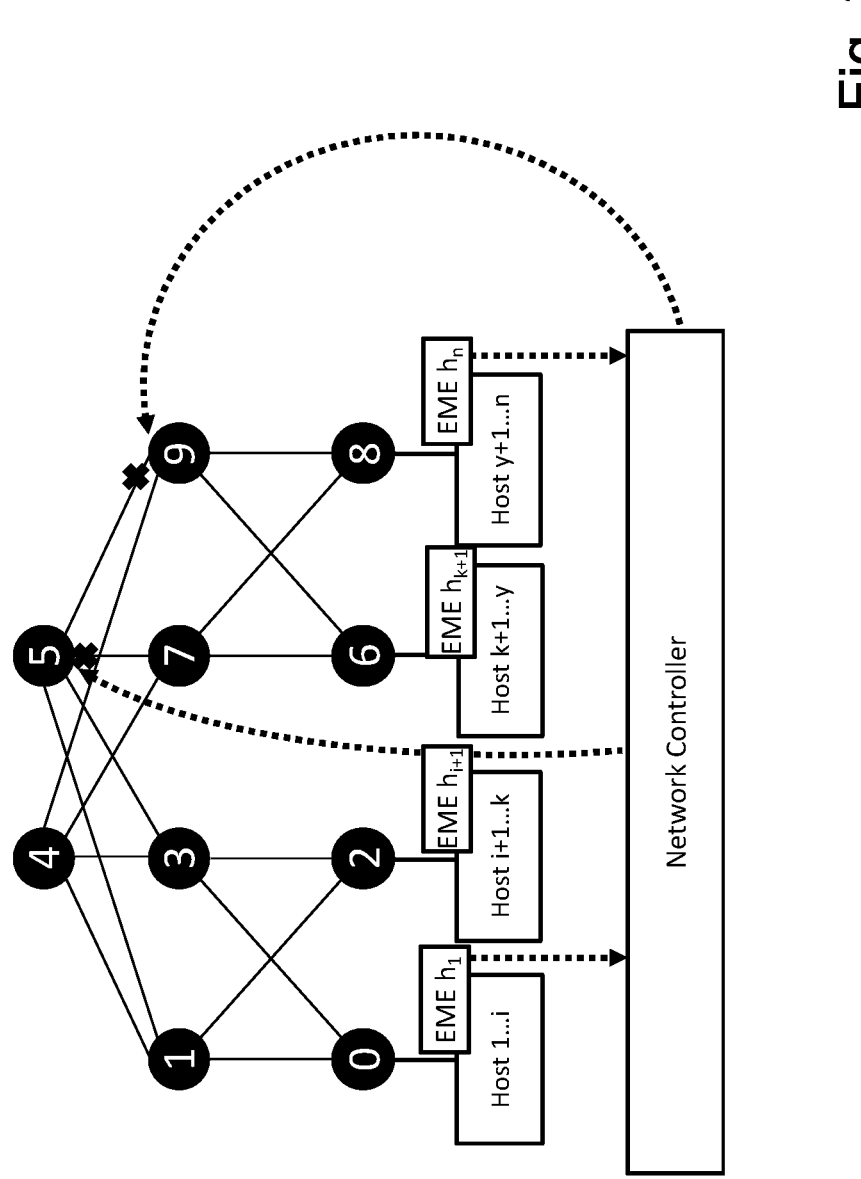
FIG. 3 shows in a diagram of out-of-band mode operations according to an embodiment of the invention.

In the out-of-band mode, see FIG. 3, the external controller can re-configure the network according to the information of the queue status reported by each EME. For example, when EME $h_1$ detects the congestion of the outgoing queue from switch 9 to switch 5, it triggers the external controller to reconfigure switch 9 to reduce the weight associated to the link 9-5. Similarly, EME $h_n$ would trigger the reconfiguration of the weight associated to the link 5-7 in switch 5 when detecting a congestion on that link. Here and in the following i, k, n and y are integers.

Figure 4:
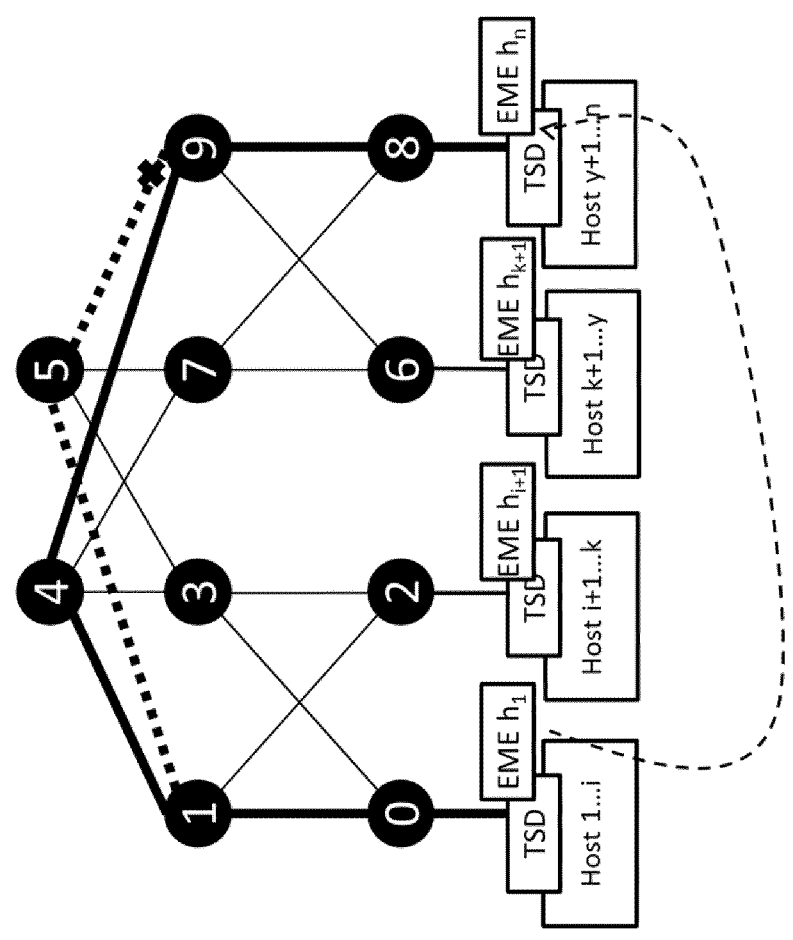
FIG. 4 shows in a diagram of in-band mode operations according to an embodiment of the invention.

In the in-band mode, see FIG. 4, an EME reports the information about the congested queue to the corresponding traffic steering devices. For example, when EME $h_1$ detects the congestion of the outgoing queue from switch 9 to switch 5, it notifies the traffic steering devices attached to hosts y+1 . . . n to rebalance the traffic from path 8,9,5,1,0 to path 8,9,4,1,0. Note that traffic steering devices, TSD, can be in charge of a single host, e.g. a programmable Network Interface Card, NIC, of physical server, or can be in charge of multiple devices, e.g. a programmable NIC in a physical server hosting multiple Virtual Machines, VMs.

Embodiment 1

In the following embodiment the proposed invention is configured in out-band mode: the offline learning phase is performed on a separate server, not shown in FIG. 5, EME modules are executed directly into the network interface cards, NIC, attached to the executor hosts and the datacenter network is composed by legacy hardware, e.g. non programmable switches. When an EME detects a congested queue, it informs the control plane that a specific link is congested. With such information, the control plane can change the weight associated to that link and reroute flows through paths that do not contain that specific link.

Figure 5:
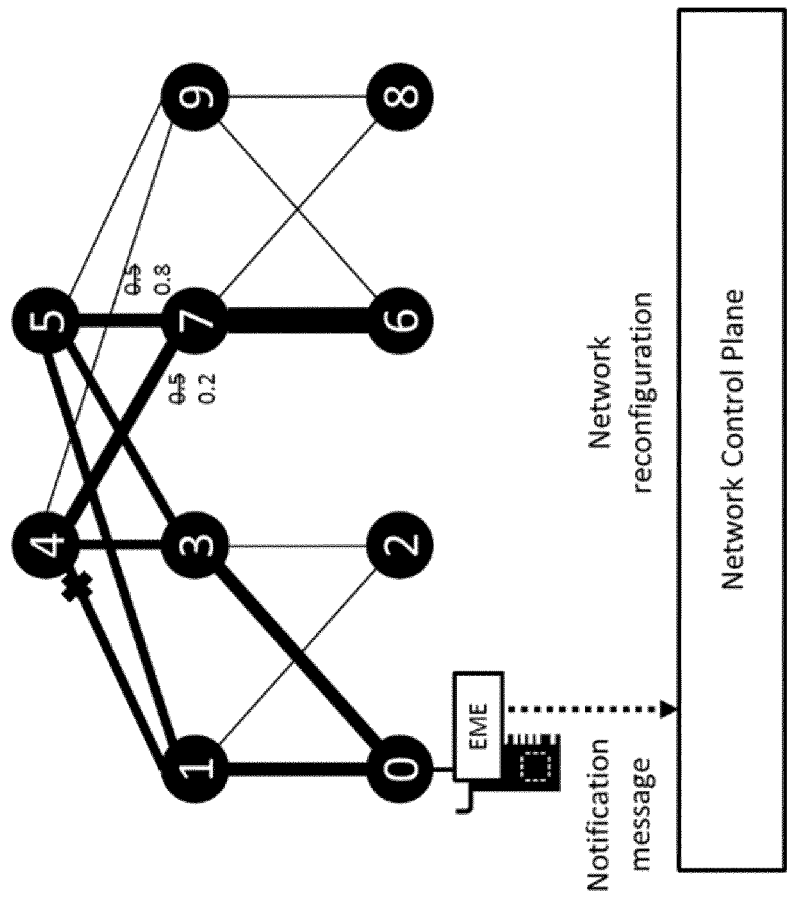
FIG. 5 shows in a diagram an implementation of embodiment 1.

FIG. 5 shows into details a possible implementation of the embodiment; the EME modules is executed directly into the end host Network Interface card. Let's assume that the network path composed by switches 6,7,4,1,0 is congested. The EME estimates which queue is congested—output queue of switch 4—and informs the control plane that reacts modifying the ECMP weights associated with the outgoing link from switch 7 to switch 4 and from switch 7 to switch 5. Thus, the traffic is rebalanced between 6,7,4,1,0 and 6,7,5,1,0 and the congestion is mitigated. Note that also other paths are affected by the congested queue, however they are not shown in the example.

Embodiment 2

Figure 6:
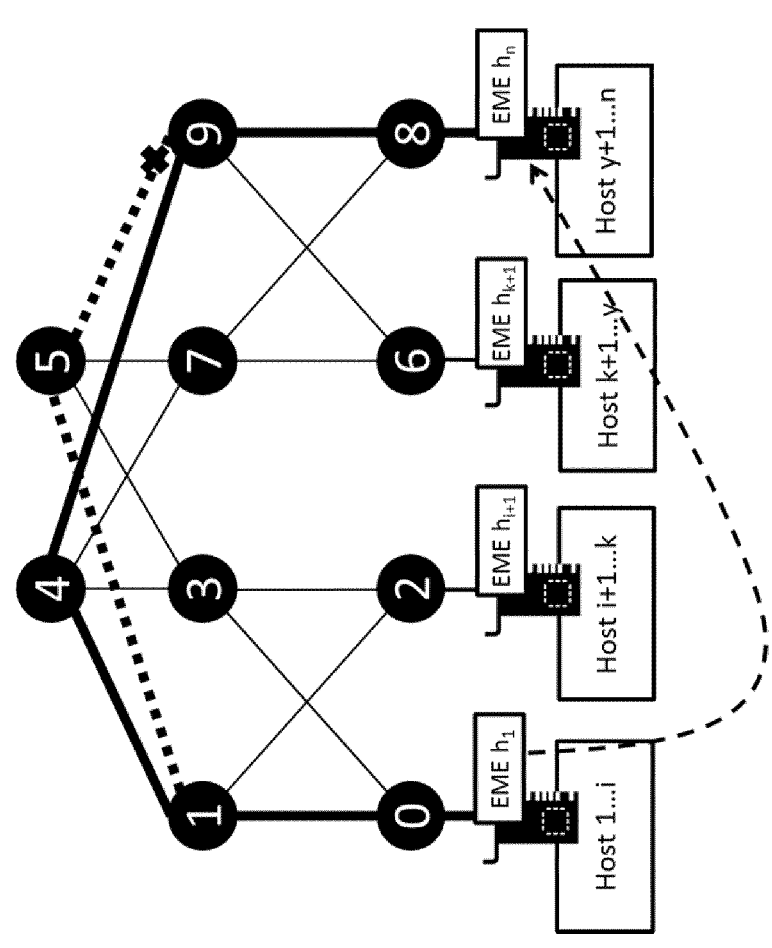
FIG. 6 shows in a diagram an implementation of embodiment 2.

In the following embodiment the proposed invention is configured in in-band mode: the offline learning phase is performed on a separate server, not shown in FIG. 6, EME modules are executed directly into the network interface cards attached to the executor hosts and the datacenter network is composed by legacy hardware, e.g. non programmable switches. Each group of virtual hosts ($\{1 \ldots i\}$, $\{i+1 \ldots k\}$,$\{k+1 \ldots y\}$,$\{y+1 \ldots n\}$) is executed inside a server connected to the network through a programmable NIC and virtual hosts are connected together using an overlay network, e.g. VXLAN, transparent to the virtual hosts and managed by the servers NIC. When an EME detects a congested queue, it informs the remote physical server NIC, using an in-band signalling mechanism, about the congested queue. With such information, the NIC will reroute traffic through a tunnel that does not traverse the congested queue.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a network, wherein an occupation level of at least one switch queue of at least one network switch is estimated, comprising the following steps:
  providing or collecting data regarding an association between at least one path delay and a corresponding switch queue occupation level of the at least one switch queue, wherein the data includes path delays and/or switch queue occupations or switch queue occupation levels that are quantized by reducing a precision according to a statistical distribution;
  feeding the data to a machine learning model associated with the at least one switch queue;
  training the machine learning model on a basis of the at least one path delay or the data to predict a switch queue occupation level of the at least one switch queue; and
  using information resulting from the trained machine learning model or using the predicted switch queue occupation level for making a real-time traffic steering decision for load balancing between network paths, wherein the trained machine learning model is disposed at an assigned candidate executor host in the network.

2. The method according to claim 1, wherein the collected data results from historical measurements from the network and/or simulated data.

3. The method according to claim 1, wherein the at least one path delay is a one-way path delay regarding incoming traffic to a respective network switch.

4. The method according to claim 1, wherein one or more subsets of network queues and/or corresponding paths are assigned to the candidate executor host or to a set of candidate executor hosts.

5. The method according to claim 1, wherein a size of one or more machine learning models is reduced or pruned.

6. The method according to claim 1, wherein the assigned candidate executor host is disposed at an end-point or edge of the network.

7. The method according to claim 1, wherein different trained machine learning models are distributed to different assigned candidate executor hosts, and wherein each of the different assigned candidate executor hosts monitors a different definable partition of the network.

8. The method according to claim 7, wherein partitioning and/or distributing of the different assigned candidate executor hosts is selected to minimize a computation time and/or maximize estimation accuracy.

9. The method according to claim 1, wherein at least one explicit congestion notification is sent in a network data plane.

10. The method according to claim 1, wherein the data and the machine learning model are split according to network topology and/or to topological information about candidate executor hosts and/or an input data collection process.

11. The method according to claim 1, wherein a simulated network for performing packet-level simulation is created.

12. The method according to claim 1, wherein the prediction of the switch queue occupation level is used by a control plane or by a data plane.

13. The method according to claim 4, wherein a network topology and/or a maximum number of candidate executor hosts is given or provided.

14. The method according to claim 1, wherein the path delays of the network are quantized according to the statistical distribution, and wherein the switch queue occupations of the network are quantized according to a number of occupation levels.

15. The method according to claim 5, wherein the size of one or more machine learning models is reduced or pruned by reducing a number of path delays.

16. The method according to claim 6, wherein one or more devices are executor hosts, and wherein the one or more devices generate at least one explicit congestion notification.

17. The method according to claim 9, wherein the at least one explicit congestion notification is sent in the network data plane to enable in-band reconfiguration of packet forwarding operations.

18. A method for operating a network, wherein an occupation level of at least one switch queue of at least one network switch is estimated, comprising the following steps:
  providing or collecting data regarding an association between at least one path delay and a corresponding switch queue occupation level of the at least one switch queue;
  feeding the data to a one or more machine learning models associated with the at least one switch queue;
  training the one or more machine learning models on a basis of the at least one path delay or the data to predict a switch queue occupation level of the at least one switch queue; and
  using information resulting from the one or more machine learning models or using the predicted switch queue occupation level for making a real-time traffic steering decision for load balancing between network paths, wherein the one or more machine learning models are disposed at an assigned candidate executor host in the network, wherein the one or more machine learning models are binarized or quantized to transform weights and activations of the one or more machine learning models from real numbers to numbers in a $\{0, 1\}$ set.

19. A system comprising one or more hardware processors which, alone or in combination, are configured to provide for execution of a method comprising:
  providing or collecting data regarding an association between at least one path delay and a corresponding switch queue occupation level of the at least one switch queue, wherein the data includes path delays and/or switch queue occupations or switch queue occupation levels that are quantized by reducing a precision according to a statistical distribution;

feeding the data to a machine learning model associated with the at least one switch queue;

training the machine learning model on a basis of the at least one path delay or the data to predict a switch queue occupation level of the at least one switch queue; and using information resulting from the trained machine learning model or using the predicted switch queue occupation level for making a real-time traffic steering decision for load balancing between network paths, wherein the trained machine learning model is disposed at an assigned candidate executor host in the network.

* * * * *